Figure 2:
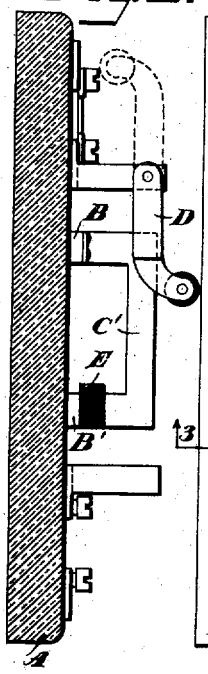

No. 12,589. REISSUED JAN. 8, 1907.

H. F. KRANTZ.

ELECTRICAL SWITCH MECHANISM.

APPLICATI FILED DEC. 26, 1905.

2 SHEETS—SHEET 1.

WITNESSES:-

J. Clyde Ripley.

Frank Stuart

INVENTOR

Hubert F. Krantz

BY Alberto Nathan

ATTORNEY

No. 12,589. REISSUED JAN. 8, 1907.

H. F. KRANTZ.

ELECTRICAL SWITCH MECHANISM.

APPLICATION FILED DEC. 26, 1905.

2 SHEETS—SHEET 2.

WITNESSES:

J. Clyde Ripley.

Frank Stuart

INVENTOR

Hubert F. Krantz

BY Albert Nathan

ATTORNEY

UNITED STATES PATENT OFFICE.

HUBERT F. KRANTZ, OF BROOKLYN, NEW YORK.

ELECTRICAL SWITCH MECHANISM.

No. 12,589. Specification of Reissued Letters Patent. Reissued Jan. 8, 1907.

Original No. 755,141, dated March 22, 1904. Application for reissue filed December 26, 1905. Serial No. 293,424.

*To all whom it may concern:*

Be it known that I, HUBERT F. KRANTZ, a citizen of the United States, residing in Brooklyn, in the county of Kings and State of New York, have invented certain new and useful Improvements in Electrical Switch Mechanism, of which the following is a specification.

This invention relates to electrical switching mechanism, and more particularly to the arrangement of bus-bars and cross-bars, their electrical connection with each other, and the contacts of the cross-bars and switches.

By my improvements I mount the cross-bars edgewise above the bus-bars in such manner that the edge of the cross-bars may form the contact parts for the switches and, if desired, may be flush with the bus-bars. This allows a saving of considerable material over prior devices, as I may carry these cross-bars the necessary distance above the bus-bars for safety instead of lengthwise away from the same. Moreover, the supports of the cross-bars act at the same time to make the proper electrical connection between the bus-bars and the cross-bars.

My improvements may be applied to various forms of switching devices; but I have shown in the drawings, by way of example, only a switchboard or panel-board similar to that shown in Patent No. 693,550, granted to me on February 18, 1902. I do not limit this invention to this form of switching mechanism, however, nor to any specific form or construction shown other than what is particularly called for in the claims hereto appended.

Figure 1:
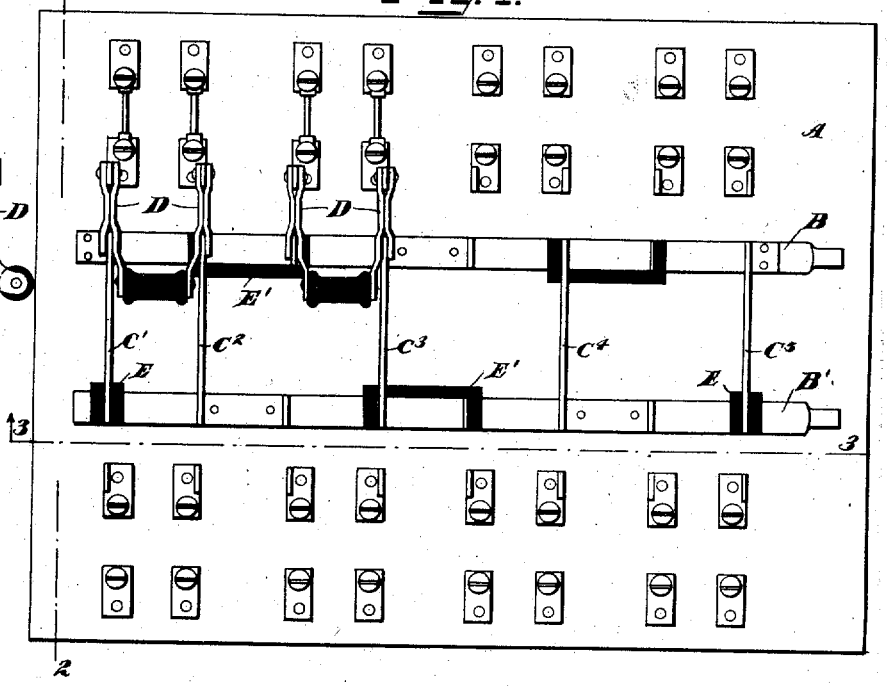
Figure 3:
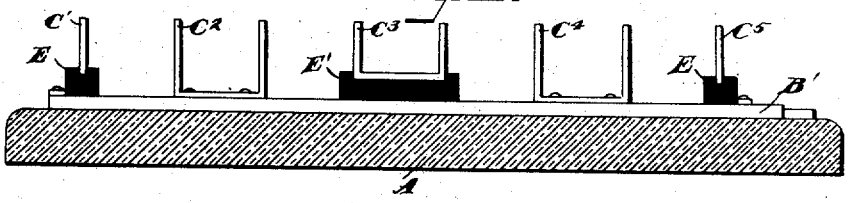
Figure 4:
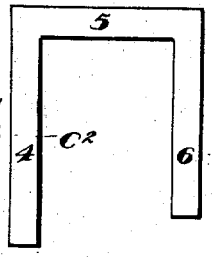
Figure 5:
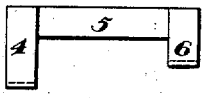
Figure 6:
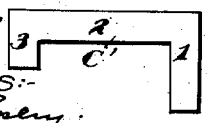
Figure 7:
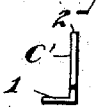
Figure 14:
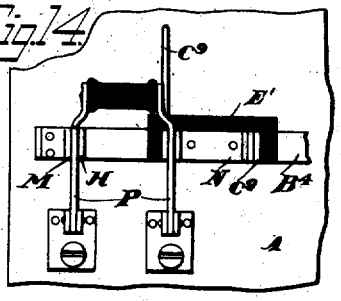
Figure 8:
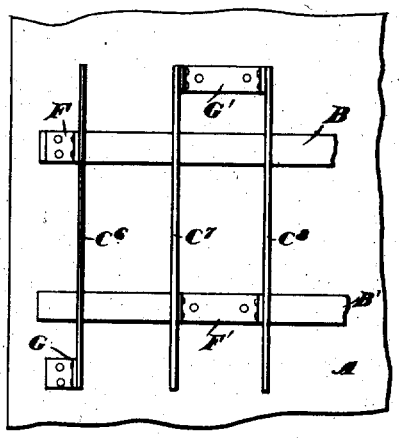
Figure 15:
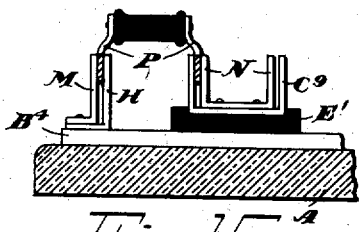
Figure 9:
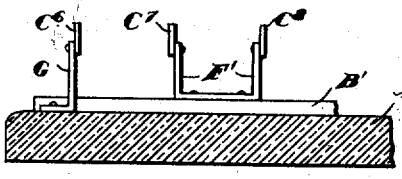
Figure 10:
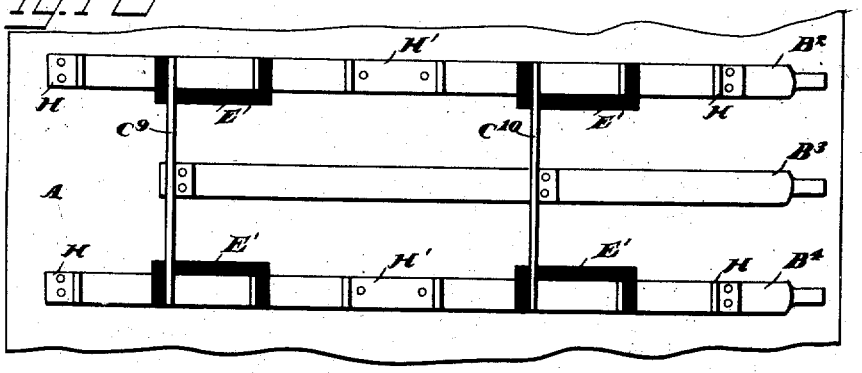
Figure 11:
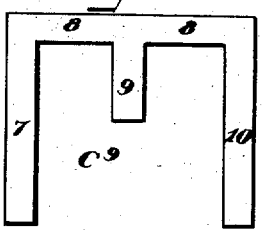
Figure 12:
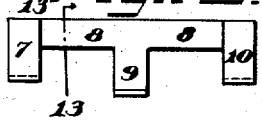
Figure 13:
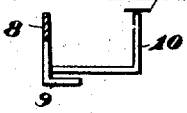

In the accompanying drawings, Figure 1 is a face view of one form of switching mechanism to which my improvements may be applied, some of the parts being omitted as unnecessary for a proper showing of my invention. Fig. 2 is a sectional view taken on line 2 2 of Fig. 1. Fig. 3 is a sectional view taken on line 3 3 of Fig. 1. Fig. 4 illustrates the blank for forming one of the middle cross-bars shown in Fig. 1. Fig. 5 is a side view of this bar when bent up into shape shown in Fig. 1. Fig. 6 illustrates the blank for forming one of the end cross-bars. Fig. 7 is an end view of one of the end bars after being bent into shape for use. Fig. 8 is a face view of a portion of a switchboard, illustrating a modification. Fig. 9 is a sectional elevation of Fig. 8. Fig. 10 is a face view of a portion of a switchboard, illustrating the connections for a three-wire switch. Fig. 11 illustrates the blank for forming one of the cross-bars shown in Fig. 10. Fig. 12 is a side view of this blank bent up. Fig. 13 is a section taken on line 13 13 of Fig. 12. Fig. 14 illustrates an arrangement such as shown in Fig. 10, having additional pieces applied to the cross-bars to act with single-blade switches, as hereinafter explained. Fig. 15 is an end view of the cross-bars and adjacent parts shown in Fig. 14.

Figs. 1 to 3 illustrate the insulating base-plate A, carrying the bus-bars B B′, which preferably rest directly upon plate A, and cross-bars $C'$ $C^2$ $C^3$ $C^4$ $C^5$, mounted edgewise above the bus-bars. The supports for holding the cross-bars in position are preferably formed in one with the cross-bars.

Fig. 6 illustrates the blanks used to form the end cross-bars $C'$ and $C^5$. The portion 1 is bent into an L, as shown in Fig. 7, and the lower arm secured—as by screws, soldering, &c.—to bus-bar B, Figs. 1 and 2. The L portion 1 is made high enough to raise the portion 2, forming the cross-bar proper, $C'$ or $C^5$, a safe distance from the bus-bars, whereby the ends of the portion 2, while preferably coming flush with the bus-bars, may form the contacts for the switches, such as shown at D in Figs. 1 and 2. Two switches only are shown for clearness. The portion 3 of blank $C'$, Fig. 6, passes down into a groove in an insulating-block E, resting on the bus-bar B′, that may be used for steadying the end of the bar not connected to the bus-bar.

From the foregoing it will be understood that the portion 1 of cross-bars $C'$ and $C^5$ acts in two capacities—first, to hold the cross-bars edgewise above the bus-bars, and, second, to make the proper electrical connection between the cross-bars and the bus-bar B.

Fig. 4 illustrates the blanks for forming the cross-bars $C^2$ $C^3$ $C^4$. The portions 4 and 6 are bent U-shaped, as shown in Fig. 3. The U portion 4 is deeper than the other and adapted to be connected to one of the bus-bars B or B′, according to position, and the more shallow U portion 6 is adapted to rest upon an insulating-block E′, Figs. 1 and 3, placed between the bus-bar and cross-bar. The cross-bars $C^2$ $C^3$ $C^4$ are thus also supported by the means for making the electrical connection with the bus-bars, and the ends of the U portions 4 and 6 form the contacts for the switches. The main ideas of this arrangement are to carry the cross-bars edgewise above the bus-bars and make the supports act at the same time as electrical connections, so that it will be evident that various ways of accomplishing these objects may be used other than shown in Figs. 1 to 7. To illustrate, in Figs. 8 and 9 the cross-bars $C^6$ $C^7$ $C^8$ may be flat strips of copper, and the electrical connecting-supports may consist of angle-pieces F F′, of suitable conducting material, to which the cross-bar strips are secured, as by riveting, soldering, &c. Also instead of the steadying-blocks E E′ of Figs. 1, 2, and 3 I may use angle-pieces G G′, riveted to the cross-bars out of the way of the bus-bars and reaching down and secured to the base-plate A. The angle-pieces G for the end bars are L-shaped, and the angle-pieces G′ are U-shaped to support two of the middle cross-bars.

It will be readily understood that a construction having the cross-bar and its support in one, as in Figs. 1 to 7, could have one of the steadying-pieces G or G′ also in one with it to reach to the base-plate out of the way of the bus-bars.

Fig. 10 illustrates an arrangement of switching mechanism for a three-wire main and two-wire branches, in which it will be seen that the current can be supplied to eight different switches by means of but two full cross-bars $C^9$ and $C^{10}$. The blank for forming the cross-bar $C^9$ (or $C^{10}$) is shown in Fig. 11. The portions 7 and 10 are bent up in the same manner as portion 6 of Figs. 4 and 5—that is, these U-shaped ends of cross-bar $C^9$ or $C^{10}$ are adapted to rest upon insulating-blocks E′ between the cross-bar and the positive and negative bus-bars $B^2$ and $B^4$. The portion 9 is bent into an L, as shown in Figs. 10, 12, and 13, the horizontal part of which is to be connected to the neutral bus-bar $B^3$. The tops of the U-shaped pieces formed by portions 7 and 10 of each cross-bar $C^9$ $C^{10}$ form the contacts for four switches for connection to the neutral bus-bar $B^3$, while in this arrangement the contacts for the positive and negative bus-bars $B^2$ and $B^4$ are formed by angle-pieces H and H′, the pieces H for the end connections being L-shaped and those for the middle connections H′ being U-shaped.

Referring to Figs. 14 and 15, it will be seen that by the addition of angle-pieces, L-shaped pieces M for the end connections, and U-shaped pieces N for the middle connections the cross-bar contacts can be made with single-blade switches, such as shown at P, Fig. 14. The arrangement here shown is similar to that shown in Fig. 10, the blade of the switch passing down between the uprights M and H, N and $C^9$, &c. It will be clear that these additional pieces M and N may be applied to the other arrangements shown.

I claim as my invention—

1. In electric switch mechanism, the combination of bus-bars, approximately flat cross-bars and switches, with means for supporting said cross-bars edgewise to said bus-bars, said means adapted to make electrical connection between said cross-bars and bus-bars, and the ends of said cross-bars forming contacts for said switches.

2. In electrical switch mechanism, the combination of switches, bus-bars, and approximately flat cross-bars the ends of which form contacts for said switches, with means for supporting said cross-bars edgewise to said bus-bars and at a distance therefrom to permit the ends of the cross-bars being approximately flush with the bus-bars, said means also adapted to make electrical connection between said cross-bars and bus-bars.

3. In electrical switch mechanism, the combination of bus-bars, and switches, with an approximately flat cross-bar adapted to be supported edgewise to said bus-bars, and electrically connected to one of said bus-bars, said cross-bar being provided with U-shaped ends forming four contacts for said switches.

4. In electrical switch mechanism, the combination of bus-bars, with an approximately flat cross-bar supported edgewise to said bus-bars, said cross-bar being provided with U-shaped ends, one of which is secured to one of said bus-bars to support the cross-bars edgewise to, and make electrical connection with, said bus-bar.

5. In electrical switch mechanism, the combination of a base-plate, and bus-bars resting thereon, with approximately flat cross-bars provided with angle-pieces adapted to make electrical connection with said bus-bars and support the cross-bars above and edgewise to said bus-bars.

6. In an electrical switch mechanism, the combination of a bus-bar, with a cross-bar comprising a flat strip having a portion projecting therefrom, the end of said portion being bent at an angle and connected to said bus-bar, whereby the body of the cross-bar is electrically connected to said bus-bar and supported edgewise thereto.

7. In a panel-board, the combination of a base-board, with bus-bars mounted flatwise thereupon, and cross-bars superposing said bus-bars and in direct contact therewith.

8. In a panel-board, the combination of bus-bars affixed directly upon a base-board, with cross-bars secured to and resting directly upon the bus-bars and terminating flush therewith in edgewise-extending switch-contact portions.

9. In a panel-board, the combination with a base-board, of bus-bars resting flatwise thereon, cross-bars rigidly secured directly upon certain bus-bars and terminating flush

BEST AVAILABLE COPY with outer bus-bars in vertically-extending wings, and pivotally-mounted switches revolubly contacting directly with said wings.

10. In a panel-board, the combination of a base-board, with bus-bars mounted thereon, cross-bars resting in direct contact with one of said bus-bars and resting upon an intermediate septum of insulating material upon another of said bus-bars, said cross-bars terminating in edgewise-extending portions, contact-pieces having upright ends affixed directly upon the outer bus-bars and intermediate the aforesaid cross-bar terminations, and switches leading to branch lines.

11. In a plural-pole panel-board, a base-board, bus-bars mounted flatwise thereon, cross-bars resting directly upon one of said bus-bars and terminating flush over another of said bus-bars in two edgewise-positioned portions and insulated therefrom, contact-pieces having two upright ends and secured directly upon the latter bus-bar intermediate the cross-bars, and two-pole switches swinging into contact with adjacent portions of said cross-bar and contact-piece, respectively.

12. An electrical switchboard comprising in combination; a plurality of switches; a plurality of elongated parallelly-disposed bus-bars of diverse polarity; a substantially flat base-board of non-conducting material underlying said bus-bars, the latter resting substantially throughout their lengths directly upon said base-board and secured thereto whereby said bus-bars are positioned a minimum distance from said base-board; and cross-bars overlying said bus-bars, each cross-bar resting upon and in direct electrical contact with the upper exposed surface of one of said bus-bars, and extending transversely over an adjacent bus-bar, and terminating in proximity with an associated switch.

13. An electrical switchboard comprising in combination, a substantially flat base-board of non-conducting material, a plurality of elongated symmetrically-arranged bus-bars of diverse polarity overlying said base-board and resting substantially throughout their lengths directly upon and secured to the upper surface of said base-board, whereby said bus-bars are positioned a minimum distance from said base-board, a cross-bar in direct electrical contact with one of said bus-bars and extending transversely over an adjacent bus-bar of opposite polarity and insulated therefrom, said cross-bar terminating adjacent said bus-bar in a plurality of contacts; and a corresponding plurality of two-pole switches, each adapted to be moved to simultaneously bring one of its poles into direct electrical connection with its associated cross-bar contact, and the other pole into electrical connection with the said bus-bar of opposite polarity.

14. An electrical switchboard comprising in combination, a substantially flat base-board of non-conducting material, a plurality of elongated symmetrically-arranged bus-bars of diverse polarity overlying said base-board and resting substantially throughout their lengths directly upon and secured to the upper surface of said base-board, whereby said bus-bars are positioned a minimum distance from said base-board, a substantially straight cross-bar overlying one of said bus-bars and resting upon and in direct electrical contact with the upper exposed surface of said bus-bar, and extending in a straight line substantially parallel with said base-board to and over, but insulated from, an adjacent bus-bar of polarity opposite to said cross-bar extension, said cross-bar terminating adjacent said bus-bar above said base-board in a pair of contacts, and a corresponding pair of two-pole switches, each adapted to be moved to simultaneously bring one of its poles into direct electrical connection with its associated cross-bar contact, and its other pole into electrical connection with the said bus-bar of opposite polarity.

15. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, an integral cross-bar of relatively high conductivity in direct electrical contact with one of said bus-bars and extending transversely to and over, but insulated from, an adjacent bus-bar of polarity opposite to said cross-bar extension, said cross-bar terminating over the said bus-bar and provided with a pair of contacts spaced apart longitudinally of said bus-bar and substantially thereover, and a corresponding pair of two-pole switches, each adapted to be moved to simultaneously bring one of its poles directly over and into direct electrical connection with its associated cross-bar contact, and its other pole directly over and into electrical connection with the said bus-bar of opposite polarity.

16. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, an integral cross-bar of relatively high conductivity in direct electrical contact with one of said bus-bars and

BEST AVAILABLE COPY extending transversely to and over, but insulated from, an adjacent bus-bar of polarity opposite to said cross-bar extension, said cross-bar terminating over the said bus-bar and provided with a pair of contacts spaced apart longitudinally of said bus-bar, contact-pieces rising from direct contact with said latter bus-bar and terminating thereabove, and a corresponding pair of two-pole switches, each adapted to be moved to simultaneously bring one of its poles into direct electrical connection with its associated cross-bar contact, and its other pole into electrical connection with the associated contact-piece above the said bus-bar of opposite polarity.

17. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, a plurality of integral cross-bars of relatively high conductivity, certain of said cross-bars being in direct electrical contact with one of said bus-bars and extending transversely to and over, but insulated from, an adjacent bus-bar of polarity opposite to said cross-bar extension, said cross-bar terminating over and flush with the outer vertical edge of said bus-bar and provided with a pair of upright contacts spaced apart longitudinally of said bus-bar and substantially flush therewith, contact-pieces rising from direct electrical contact with said latter bus-bars, positioned thereby, and terminating thereabove on a level with the upper ends of the aforesaid upright contacts, certain of said contact-pieces providing a single pole and positioned near the outer poles of the outer cross-bars, the other of said contact-pieces providing two poles and positioned intermediate adjacent cross-bars, and a corresponding number of two-pole switches, each adapted to be moved to simultaneously bring one of its poles into direct electrical connection with its associated cross-bar contact, and its other pole into electrical connection with the associated contact-piece above the said bus-bar of opposite polarity.

18. An electrical switchboard comprising in combination, a substantially flat base-board of non-conducting material, a plurality of elongated parallelly-arranged bus-bars, of relatively high conductivity and of diverse polarity, overlying said base-board and resting directly upon and secured to the upper surface of said base-board so as to lie in a plane substantially parallel with said base-board, the adjacent bus-bars being substantially equidistantly spaced apart, a plurality of cross-bars of relatively high conductivity, one of said cross-bars being in electrical contact with one of said bus-bars and extending transversely toward, but insulated from, an adjacent bus-bar of polarity opposite to said cross-bar extension, said cross-bar terminating above the said bus-bar and provided with a pair of contacts spaced apart longitudinally of said bus-bar, contact-pieces rising from direct electrical contact with said latter bus-bars, positioned thereby, and terminating thereabove on substantially a level with the upper end of the aforesaid upright contacts, certain of said contact-pieces providing a single pole and positioned near the outer poles of the outer cross-bars, the other of said contact-pieces providing two poles and positioned intermediate adjacent cross-bars, said cross-bar contacts and said poles being equidistantly spaced apart longitudinally of said bus-bar, and a corresponding number of two-pole switches, each adapted to be moved to simultaneously bring one of its poles into direct electrical connection with its associated cross-bar contact, and its other pole into electrical connection with the associated contact-piece above the said bus-bar of opposite polarity.

19. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, an integral cross-bar of relatively high conductivity in direct electrical contact with one of said bus-bars and extending transversely to and over, but separated from, an adjacent bus-bar of polarity opposite to said cross-bar extension, said cross-bar terminating over and flush with the said bus-bar and provided with a pair of contacts spaced apart longitudinally of said bus-bar and substantially flush therewith, a block of non-conducting material extending a distance above said bus-bar and arranged to support said cross-bar a predetermined distance above and out of contact with said bus-bar, and a corresponding pair of two-pole switches, each adapted to be moved to simultaneously bring one of its poles into direct electrical connection with its associated cross-bar contact, and its other pole into electrical connection with the said bus-bar of opposite polarity.

20. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, a plurality of cross-bars of relatively high conductivity, all in direct electrical contact with one of said bus-bars and extending transversely to and over, but insulated from, an adjacent bus-bar of polarity opposite to said cross-bar extension, said cross-bar terminating over and flush with the said bus-bar and provided with a pair of contacts spaced apart longitudinally of said bus-bar and substantially flush therewith, and a corresponding pair of two-pole switches, each adapted to be moved to simultaneously bring one of its poles into direct electrical connection with its associated cross-bar contact, and its other pole into electrical connection with the said bus-bar of opposite polarity.

21. An electrical switchboard comprising in combination, a substantially flat base-board of non-conducting material, three elongated equispaced and parallelly-arranged bus-bars, of relatively high conductivity and of diverse polarity, overlying said base-board and resting directly upon and secured to the upper surface of said base-board so as to lie in a plane substantially parallel with said base-board, a plurality of integral cross-bars of relatively high conductivity, each in direct electrical contact with the intermediate one of said bus-bars and extending transversely to and over, but insulated from, the adjacent bus-bars of polarity opposite to each other and the associated cross-bar extensions, said cross-bars terminating over the said bus-bars and each provided with a pair of contacts spaced apart longitudinally of said bus-bar, contact-pieces rising from direct contact with associated bus-bars and providing a pole adjacent each of the aforesaid contacts and of polarity opposite thereto, and a corresponding pair of two-pole switches, each adapted to be moved to simultaneously bring one of its poles into direct electrical connection with its associated cross-bar contact, and its other pole into electrical connection with the said bus-bar of opposite polarity.

22. An electrical switchboard comprising in combination, a substantially flat base-board of non-conducting material, a plurality of elongated equispaced and parallelly-arranged bus-bars, of relatively high conductivity and of diverse polarity, overlying said base-board and resting directly upon and secured to the upper surface of said base-board so as to lie in a plane substantially parallel with said base-board, an I-shaped cross-bar of relatively high conductivity in direct electrical contact with one of said bus-bars and extending transversely to and over, but insulated from, an adjacent bus-bar of polarity opposite to said cross-bar extension, said cross-bar terminating over and flush with the said bus-bar and provided with a pair of upright contacts spaced apart longitudinally of said bus-bar and substantially flush therewith, a plurality of V-shaped contact-pieces in direct contact with and positioned by said bus-bar and positioned intermediate adjacent cross-bars, and a corresponding pair of two-pole switches, each adapted to be moved to simultaneously bring one of its poles into direct electrical connection with its associated cross-bar contact, and its other pole into electrical connection with a pole of its associated contact-piece of opposite polarity.

In testimony whereof I have signed my name to this specification in the presence of two subscribing witnesses.

HUBERT F. KRANTZ.

Witnesses:
GEORGE W. ECKERSON,
S. L. WHITLOCK.